(12) United States Patent
Okazaki et al.

(10) Patent No.: US 12,359,989 B2
(45) Date of Patent: Jul. 15, 2025

(54) SENSOR DEVICE

(71) Applicant: SUMITOMO HEAVY INDUSTRIES, LTD., Tokyo (JP)

(72) Inventors: Osamu Okazaki, Kanagawa (JP); Yoshihisa Usami, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 328 days.

(21) Appl. No.: 17/873,931

(22) Filed: Jul. 26, 2022

(65) Prior Publication Data
US 2023/0036638 A1    Feb. 2, 2023

(30) Foreign Application Priority Data

Jul. 28, 2021    (JP) .................................. 2021-123292

(51) Int. Cl.
| | |
|---|---|
| *G01L 1/22* | (2006.01) |
| *F16H 49/00* | (2006.01) |
| *F16H 57/01* | (2012.01) |
| *G01L 3/14* | (2006.01) |
| *G01L 5/00* | (2006.01) |

(52) U.S. Cl.
CPC ............ *G01L 1/225* (2013.01); *F16H 49/001* (2013.01); *F16H 57/01* (2013.01); *G01L 3/14* (2013.01); *G01L 3/1457* (2013.01); *G01L 5/0042* (2013.01); *F16H 2057/012* (2013.01); *G01L 5/0019* (2013.01)

(58) Field of Classification Search
CPC ......... G01L 1/225; G01L 3/14; G01L 3/1457; G01L 5/0042; G01L 5/0019; F16H 49/001; F16H 57/01; F16H 2057/012
See application file for complete search history.

(56) References Cited

U.S. PATENT DOCUMENTS

| | | | | |
|---|---|---|---|---|
| 6,962,088 B2 * | 11/2005 | Horiuchi | ............... | F16H 49/001 |
| | | | | 73/862.338 |
| 10,400,880 B2 * | 9/2019 | Meyer | ..................... | G08C 17/02 |
| 2023/0008068 A1 * | 1/2023 | Pointner | ............... | G01L 5/0019 |

FOREIGN PATENT DOCUMENTS

| | | | | |
|---|---|---|---|---|
| CN | 112543863 A | * | 3/2021 | ............ B25J 9/1025 |
| EP | 1659385 A2 | * | 5/2006 | ............ F16C 19/522 |
| JP | H07-020537 U | | 4/1995 | |
| JP | 3575719 B2 | * | 10/2004 | |
| WO | WO-2007129448 A1 | * | 11/2007 | ............ B60B 27/00 |
| WO | WO-2010142318 A1 | * | 12/2010 | ............ B25J 13/085 |
| WO | WO-2013114289 A1 | * | 8/2013 | ............ G01K 1/143 |
| WO | WO-2018073188 A1 | * | 4/2018 | ............ B25J 13/085 |
| WO | WO-2018210365 A1 | * | 11/2018 | ............ G01L 1/2231 |

OTHER PUBLICATIONS

CN-112543863-A, English Translation (Year: 2021).*

(Continued)

*Primary Examiner* — Ryan D Walsh
(74) *Attorney, Agent, or Firm* — Michael Best & Friedrich LLP (57) ABSTRACT

Provided is a sensor device that detects a predetermined state quantity, including: a correction unit that performs first detection and second detection having a smaller generated state quantity than the first detection, and that corrects a detection value of the first detection, based on a detection value of the second detection.

11 Claims, 8 Drawing Sheets

(56) References Cited

OTHER PUBLICATIONS

EP-1659385-A2, English Translation (Year: 2006).*
JP-3575719-B2, English Translation (Year: 2004).*
WO-2007129448-A1, English Translation (Year: 2007).*
WO-2010142318-A1, English Translation (Year: 2010).*
WO-2013114289-A1, English Translation (Year: 2013).*
WO-2018073188-A1, English Translation (Year: 2018).*
WO-2018210365-A1, English Translation (Year: 2018).*

* cited by examiner

SENSOR DEVICE

RELATED APPLICATIONS

The content of Japanese Patent Application No. 2021-123292, on the basis of which priority benefits are claimed in an accompanying application data sheet, is in its entirety incorporated herein by reference.

BACKGROUND

Technical Field

Certain embodiments of the present invention relate to a sensor device.

Description of Related Art

For example, a sensor device that detects a state quantity of a target device includes a device that detects distortion of an internal gear of a bending meshing type gear device by using a distortion gauge (for example, refer to the related art).

SUMMARY

According to an embodiment of the present invention, there is provided a sensor device that detects a predetermined state quantity, including: a correction unit that performs first detection and second detection having a smaller generated state quantity than the first detection, and that corrects a detection value of the first detection, based on a detection value of the second detection.

DETAILED DESCRIPTION

However, in the related art, there is room for improvement in taking measures against disturbance.

It is desirable to detect a proper state quantity by reducing influence of the disturbance.

According to the present invention, a proper state quantity can be detected by reducing influence of disturbance.

Hereinafter, embodiments of the present invention will be described in detail with reference to the drawings.

Embodiment 1

In Embodiment 1, an example will be described in which a sensor device 60 (refer to FIG. 2) that detects distortion (state quantity) of a bending meshing type gear device (rotary device) 1 as a target device serving as a target by using a distortion gauge 416 (detection unit) is adopted as a target device that detects the state quantity of the bending meshing type gear device 1. The distortion detected by the sensor device 60 is used for detecting a torque of the bending meshing type gear device 1.

Bending meshing Type Gear Device

Figure 1:
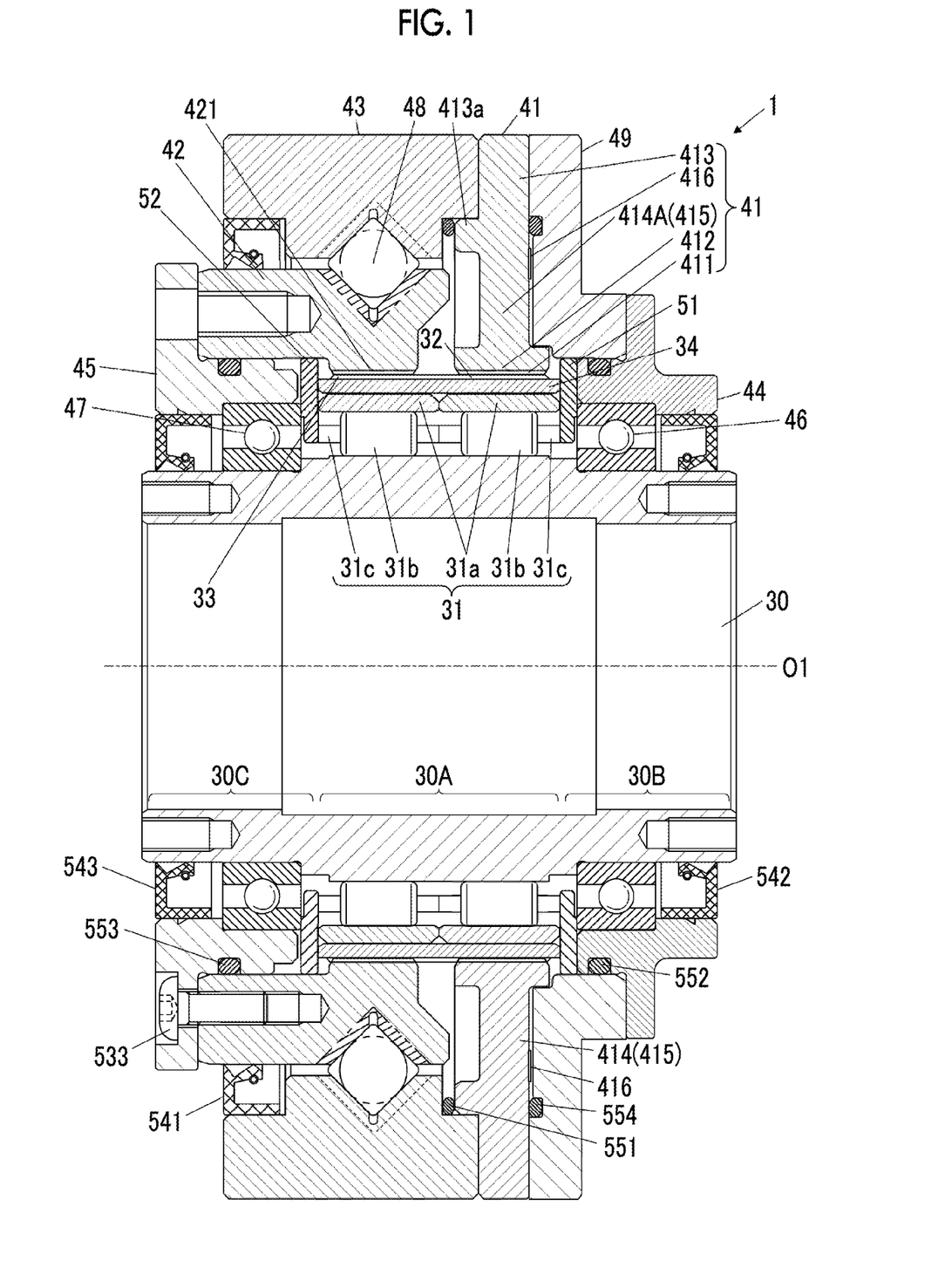
FIG. 1 is an axial sectional view illustrating a bending meshing type gear device to which a sensor device according to Embodiment 1 of the present invention is applied.

FIG. 1 is an axial sectional view illustrating the bending meshing type gear device 1 to which the sensor device 60 according to Embodiment 1 of the present invention is applied.

In the following description, a direction parallel to a rotary axis O1 (to be described later) will be referred to as an axial direction, a direction along a circumference around the rotary axis O1 will be referred to as a circumferential direction, and a direction along a radius of the circumference around the rotary axis O1 will be referred to as a radial direction.

The bending meshing type gear device 1 is a speed reducer, for example. The bending meshing type gear device 1 is not particularly limited to a specific use, and is applicable to various uses. For example, the bending meshing type gear device 1 is used to drive a joint of a cooperative robot that carries out work in cooperation with a person. The bending meshing type gear device 1 includes a wave generator shaft 30, a wave generator bearing 31, a first external tooth portion 32 (external gear), a second external tooth portion 33 (external gear), a first internal tooth portion 411, a second internal tooth portion 421, a casing 43, a first cover 44, a second cover 45, a third cover 49, bearings 46 and 47, a main bearing 48, and stopper rings 51 and 52.

The wave generator shaft 30 is a hollow cylindrical shaft that rotates around the rotary axis O1, and has a wave generator 30A having a non-circular (for example, elliptical) outer shape in a cross section perpendicular to the rotary axis O1 (axially right-angled cross section), and shaft portions 30B and 30C provided on both sides in the axial direction of the wave generator 30A. The elliptical shape does not need to be a geometrically exact elliptical shape, and includes a substantially elliptical shape. The shaft portions 30B and 30C are shafts having a circular outer shape in the cross section perpendicular to the rotary axis O1. The wave generator shaft 30 may be a solid shaft.

The first internal tooth portion 411 is configured so that teeth are provided in a portion of an inner periphery of a first internal tooth member 41 serving as a stiff internal gear.

The second internal tooth portion 421 is configured so that teeth are provided in a portion of an inner periphery of a stiff second internal tooth member 42.

The first external tooth portion 32 and the second external tooth portion 33 are integrally provided so that one and the other are aligned in the axial direction in an outer periphery of one flexible metal cylindrical base portion 34. The first external tooth portion 32, the second external tooth portion 33, and the base portion 34 form an external gear.

The first external tooth portion 32 meshes with the first internal tooth portion 411, and the second external tooth portion 33 meshes with the second internal tooth portion 421.

For example, the wave generator bearing 31 is a roller bearing, and is disposed between the wave generator 30A and the base portion 34 in which the first external tooth portion 32 and the second external tooth portion 33 are formed. The wave generator 30A, the first external tooth portion 32, and the second external tooth portion 33 are relatively rotatable via the wave generator bearing 31.

The wave generator bearing 31 has an outer ring 31a fitted into the base portion 34, a plurality of rolling elements (rollers) 31b, and a holder 31c for holding the plurality of rolling elements 31b.

The plurality of rolling elements 31b have a first group of the rolling elements 31b disposed inward in the radial direction of the first external tooth portion 32 and the first internal tooth portion 411 and aligned in the circumferential direction, and a second group of the rolling elements 31b disposed inward in the radial direction of the second external tooth portion 33 and the second internal tooth portion 421 and aligned in the circumferential direction. The rolling elements 31b roll on rolling surfaces by using an outer peripheral surface of the wave generator 30A and an inner peripheral surface of the outer ring 31a. The wave generator bearing 31 may have an inner ring separate from the wave generator 30A. The wave generator bearing 31 may not have the outer ring 31a, and an inner peripheral surface of the base portion 34 may be used as an outer ring-side rolling surface. A type of the rolling element is not particularly limited, and may be a ball, for example. In addition, the number of rows of the rolling elements is not limited to two. The number may be one row, or three or more rows.

The stopper rings 51 and 52 are disposed on both sides in the axial direction of the first external tooth portion 32, the second external tooth portion 33, and the wave generator bearing 31, thereby restricting an axial movement of the first external tooth portion 32, the second external tooth portion 33, and the wave generator bearing 31.

The casing 43 covers an outer peripheral side of the second internal tooth member 42. An outer ring portion of a main bearing 48 is formed in an inner peripheral portion of the casing 43, and rotatably supports the second internal tooth member 42 via the main bearing 48. The casing 43 is connected to the first internal tooth member 41 via a connection member such as a bolt.

For example, the main bearing 48 is a cross roller bearing, and has a plurality of rolling elements disposed between an inner ring portion integrated with the second internal tooth member 42 and an outer ring portion integrated with the casing 43. A type of the main bearing 48 is not particularly limited. For example, the main bearing 48 may be configured to include a plurality of bearings (angular ball bearings or tapered bearings) separated in the axial direction between the second internal tooth member 42 and the casing 43, or may be a four-point contact ball bearing. In addition, the main bearing 48 may have a dedicated inner ring and outer ring separated from the second internal tooth member 42 and the casing 43.

In addition, an oil seal 541 is provided between the casing 43 and the second internal tooth member 42, on an output side of the main bearing 48, thereby suppressing an outflow of a lubricant flowing outward (to the output side) in the axial direction.

For example, the first cover 44 is connected to the third cover 49 via a connection member such as a bolt (not illustrated), and, for example, the third cover 49 is connected to the first internal tooth member 41 and the casing 43 via a connection member such as a bolt (not illustrated).

The first cover 44 covers the first external tooth portion 32 and the first internal tooth portion 411 from a counter-output side in the axial direction. The first cover 44, the third cover 49, the first internal tooth member 41, and the casing 43 are directly or indirectly connected to an external member (for example, a base end-side arm member of a cooperative robot).

For example, a side connected to an external member (also referred to as a mating member, for example, one member for transmitting power between main body devices in which the bending meshing type gear device 1 is incorporated as a component) to output a decelerated motion to the external member will be referred to as the output side. A side opposite to the output side in the axial direction will be referred to as the counter-output side. A bearing 46 is disposed between the first cover 44 and the shaft portion 30B of the wave generator shaft 30, and the wave generator shaft 30 is rotatably supported by the first cover 44. As the bearing 46, a ball bearing is used as an example. However, other radial bearings may be used.

An oil seal 542 is provided between the first cover 44 and the shaft portion 30B of the wave generator shaft 30, on the counter-output side of the bearing 46, thereby suppressing the outflow of the lubricant flowing outward (to the counter-output side) in the axial direction.

For example, the second cover 45 is connected to the second internal tooth member 42 via a connection member 533 such as a bolt, and covers the second external tooth portion 33 and the second internal tooth portion 421 from the output side in the axial direction. The second cover 45 and the second internal tooth member 42 are connected to an external member (for example, a tip side arm member of the cooperative robot) that outputs a decelerated motion (the external member is a member that rotates relative to an external member to which the first internal tooth member 41 is connected).

A bearing 47 is disposed between the second cover 45 and the shaft portion 30C of the wave generator shaft 30, and the wave generator shaft 30 is rotatably supported by the second cover 45. As the bearing 47, a ball bearing is used as an example. However, other radial bearings may be used.

An oil seal 543 is provided between the second cover 45 and the shaft portion 30C of the wave generator shaft 30, on the output side of the bearing 47, thereby suppressing the outflow of the lubricant flowing outward (to the output side) in the axial direction. The second cover 45 may be integrally formed with the second internal tooth member 42.

Furthermore, a sealing O-ring 551 is interposed between the first internal tooth member 41 and the casing 43.

Similarly, a sealing O-ring 554 is interposed between the first internal tooth member 41 and the third cover 49, a sealing O-ring 552 is interposed between the third cover 49 and the first cover 44, and a sealing O-ring 553 is interposed between the second internal tooth member 42 and the second cover 45.

Therefore, an internal space of the bending meshing type gear device 1 (a space where a meshing portion between the first external tooth portion 32 and the first internal tooth portion 411, a meshing portion between the second external tooth portion 33 and the second internal tooth portion 421, the main bearing 48, the bearings 46 and 47, the wave generator bearing 31, and the like are present) is a lubricant filling space to be filled with the lubricant, and is hermetically sealed with the oil seals 541 to 543 and the O-rings 551 to 554.

Figure 2:
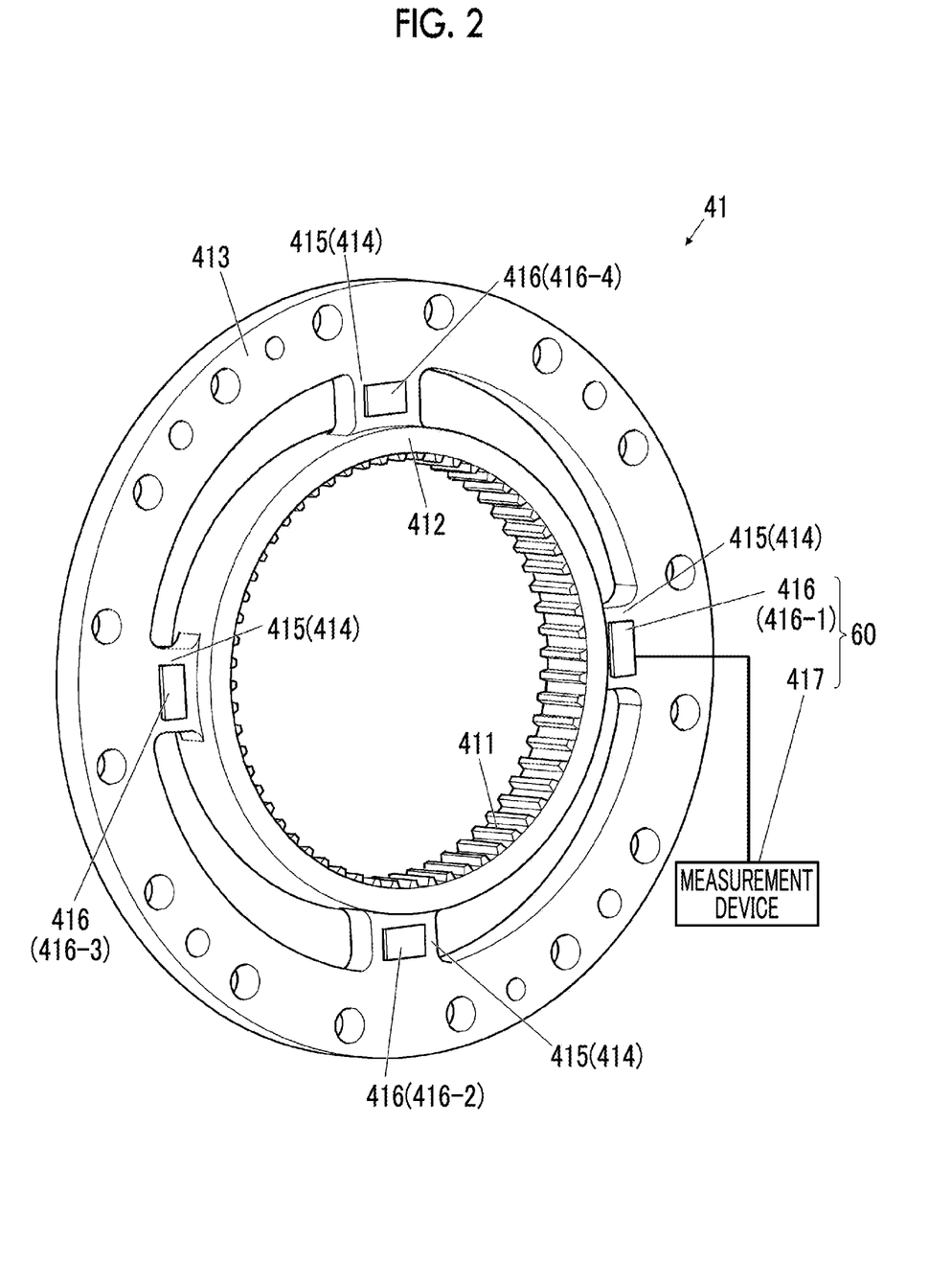
FIG. 2 is a perspective view of a first internal tooth member.

FIG. 2 is a perspective view of the first internal tooth member 41. As illustrated, the first internal tooth member 41 includes an internal tooth ring portion 412, an inner periphery of which has an internal tooth of the first internal tooth portion 411, an external connection portion 413 connected to an external member together with the casing 43 and the third cover 49, and an easily deformable portion 414 which is provided between the internal tooth ring portion 412 and the external connection portion 413 in the radial direction, and which is more likely to be deformed (which has a larger deformation amount) than the internal tooth ring portion 412 when a torque acts on the first internal tooth member 41.

The internal tooth ring portion 412 has a ring shape, and the first internal tooth portion 411 (internal tooth) is formed on an inner peripheral surface thereof.

The external connection portion 413 has a ring shape, and is located in the outermost periphery of the first internal tooth member 41. A plurality of attachment holes penetrating in the axial direction are formed for the external member at a constant interval in the circumferential direction. The external connection portion 413 may be directly connected to the external member, or may be connected to the external member via the first cover 44 or the third cover 49.

The easily deformable portion 414 is configured to include a plurality of pillar members 415 intermittently provided in the circumferential direction between the internal tooth ring portion 412 and the external connection portion 413.

The pillar member 415 extends outward in the radial direction from an outer periphery of the internal tooth ring portion 412, and is connected to an inner periphery of the external connection portion 413. Here, a case where the easily deformable portion 414, the internal tooth ring portion 412, and the external connection portion 413 are integrally formed of the same material (for example, a metal material or a resin material) will be described as an example.

In addition, a case where four pillar members 415 are provided at a constant interval in the circumferential direction will be described as an example. That is, the pillar members 415 are disposed in both end portions of the first internal tooth member 41 in each of two radial directions perpendicular to each other.

It is preferable that the interval between the respective pillar members 415 in the circumferential direction is uniform. However, this configuration is not essential. In addition, the number of the pillar members 415 can be increased or decreased.

The external connection portion 413 and the pillar member 415 have the same width (thickness) in the axial direction, and have a narrower axial width than the internal tooth ring portion 412. The pillar member 415 may have an axial width different from that of the external connection portion 413. For example, when intensity for ensuring a torque transmission function is sufficient, the pillar member 415 may have an axial width smaller than that of the external connection portion 413. In addition, the pillar member 415 may have a recessed portion for accommodating the distortion gauge 416.

A projection 413a projecting to the output side is formed over the entire circumferential direction on an output side flat surface inside the external connection portion 413 in the radial direction, and is fitted (spigot fitted) into a counter-output side recessed portion of the casing 43.

Deceleration Operation

When a rotary motion is input from a motor (not illustrated) and the wave generator shaft 30 rotates, the motion of the wave generator 30A is transmitted to the first external tooth portion 32 and the second external tooth portion 33. In this case, the first external tooth portion 32 and the second external tooth portion 33 are restricted to a shape formed along an outer peripheral surface of the wave generator 30A, and are bent in an elliptical shape having a major axis portion and a minor axis portion when viewed in the axial direction. Furthermore, the first external tooth portion 32 meshes with the first internal tooth portion 411 of the fixed first internal tooth member 41 in the major axis portion. Therefore, the first external tooth portion 32 and the second external tooth portion 33 do not rotate at the same rotation speed as that of the wave generator 30A. The wave generator 30A relatively rotates inside the first external tooth portion 32 and the second external tooth portion 33. Then, in response to the relative rotation, the first external tooth portion 32 and the second external tooth portion 33 are bent and deformed so that a major axis position and a minor axis position move in the circumferential direction. A period of the deformation is proportional to a rotation period of the wave generator shaft 30.

When the first external tooth portion 32 and the second external tooth portion 33 are bent and deformed, the major axis positions move. In this manner, a meshing position between the first external tooth portion 32 and the first internal tooth portion 411 is changed in a rotation direction. Here, it is assumed that the number of teeth of the first external tooth portion 32 is set to 100 and the number of teeth of the first internal tooth portion 411 is set to 102. In this case, each time the meshing position rotates once, meshing teeth of the first external tooth portion 32 and the first internal tooth portion 411 are shifted from each other. In this manner, the first external tooth portion 32 rotates (revolves). When the number of teeth is set as described above, the rotary motion of the wave generator shaft 30 is decelerated at a deceleration ratio of 100:2, and is transmitted to the first external tooth portion 32.

Meanwhile, the second external tooth portion 33 having the base portion 34 in common with the first external tooth portion 32 meshes with the second internal tooth portion 421. Accordingly, due to the rotation of the wave generator shaft 30, the meshing position between the second external tooth portion 33 and the second internal tooth portion 421 is also changed in the rotation direction. Meanwhile, the number of teeth of the second internal tooth portion 421 and the number of teeth of the second external tooth portion 33 coincide with each other. Accordingly, the second external tooth portion 33 and the second internal tooth portion 421 do not relatively rotate. The rotary motion of the second external tooth portion 33 is transmitted to the second internal tooth portion 421 at a reduction ratio of 1:1. For these reasons, the rotary motion of the wave generator shaft 30 is decelerated at a reduction ratio of 100:2, and is transmitted to the second internal tooth member 42 and the second cover 45. Then, the decelerated rotary motion is output to the external member.

Sensor Device

As illustrated in FIG. 2, the sensor device 60 includes distortion gauges 416-1 to 416-4 serving as a detection unit provided in each of the pillar members 415 of the first internal tooth member 41, and a measurement device 417 connected to each of the distortion gauges 416-1 to 416-4.

All of the distortion gauges 416-1 to 416-4 are distortion gauges having the same structure, characteristics, and performance. When common description is made without distinguishing the distortion gauges from each other, the distortion gauges will be generally referred to as a "distortion gauge 416".

The distortion gauge 416-1 and the distortion gauge 416-3 are respectively provided in one and the other of the two pillar members 415 located in both end portions in the radial direction. The distortion gauge 416-2 and the distortion gauge 416-4 are respectively provided in one and the other of the two pillar members 415 located in both end portions in the other radial direction perpendicular to the radial direction.

In the following description, disposition of the two distortion gauges 416-1 and 416-3 located in both end portions in the radial direction and disposition of the two distortion gauges 416-2 and 416-4 located in both end portions in the other radial direction will be referred to as "diagonal disposition". Disposition of the two distortion gauges 416-1 and 416-2, the two distortion gauges 416-1 and 416-4, the two distortion gauges 416-3 and 416-2, and the two distortion gauges 416-3 and 416-4, which are not the "diagonal disposition" will be referred to as "non-diagonal disposition".

In addition, in a rotational operation of the bending meshing type gear device 1, when the distortion gauge 416 is located on the "major axis side" of the wave generator 30A, the distortion gauge 416 is indicated as being located within a predetermined angle range on both sides in the circumferential direction around the major axis of the wave generator 30A. In addition, when the distortion gauge 416 is closer to the major axis than the minor axis of the wave generator 30A, the distortion gauge 416 can be described as being located on the "major axis side".

In addition, when the distortion gauge 416 is located on the "minor axis side" of the wave generator 30A, the distortion gauge 416 is indicated as being closer to the minor axis than when the distortion gauge 416 is located on the major axis side (when the distortion gauge 416 is located on a side other than the major axis side). Furthermore, the distortion gauge 416 may be described as being located within the predetermined angle range on both sides in the circumferential direction around the minor axis of the wave generator 30A.

For example, as a predetermined angle on the "major axis side" or the "minor axis side", an angle within a range of 45° in both directions around the major axis or the minor axis will be described as an example. However, the angle may be set to be narrower.

As an example, a case will be described where the distortion gauge 416 is attached to the pillar member 415 in a direction for detecting expansion-contraction distortion of the pillar member 415 in the radial direction.

The direction of the distortion detected by the distortion gauge 416 is not limited to the radial direction, and may be the circumferential direction or the axial direction. Alternatively, the direction may be an oblique direction in which all of these directions are combined.

The easily deformable portion 414 (pillar member 415) is more significantly deformed than the internal tooth ring portion 412, when a torque acts on the first internal tooth member 41 (specifically, in a state where the external connection portion 413 is connected to the external member, when the first internal tooth portion 411 receives a meshing reaction force so that a torque acts on the first internal tooth member 41). As a result, the expansion-contraction distortion in the radial direction which occurs in the pillar member 415 increases. The distortion of the pillar member 415 has a correlation with the torque. Accordingly, the torque can be acquired by causing the distortion gauge 416 to detect the distortion.

Each of the distortion gauges 416 is connected to a measurement device 417. FIG. 2 illustrates a state where only one distortion gauge 416 is connected. However, in reality, all of the distortion gauges 416 are connected to the measurement device 417.

The distortion gauge 416 has a characteristic that a resistance value is changed in accordance with the distortion. Therefore, the measurement device 417 can acquire the distortion by receiving a detection signal (for example, a voltage signal) indicating the resistance value of each of the distortion gauges 416.

In the bending meshing type gear device 1, the pillar member 415 on the major axis side of the substantially elliptical wave generator 30A that rotates contracts most. The measurement device 417 includes a rotation detection device (not illustrated) that detects a rotation angle of the wave generator 30A, and acquires a distortion detection signal for each of the distortion gauges 416 at a time when each of the pillar members 415 detects the rotation angle on the major axis side of the wave generator 30A.

In addition, the measurement device 417 has a data table in which a detection value indicated by the distortion detection signal of the distortion gauge 416 located on the major axis side of the wave generator 30A and a torque value are associated with each other, and can acquire the torque value with reference to the data table. The measurement device 417 may calculate and acquire the torque value from the detection value of each of the distortion gauges 416 without using the data table.

Each of the distortion gauges 416 individually performs first detection and second detection having a smaller amount of the generated distortion than that of the first detection in response to the rotation angle of the wave generator 30A. Therefore, the measurement device 417 performs correction (temperature compensation) on fluctuations caused by disturbance (environmental temperature) of the detection value of the first detection, based on the detection value of the second detection performed by the other distortion gauge 416 when each of the distortion gauges 416 performs the first detection.

Here, it is preferable to adopt a configuration as follows. The other distortion gauge 416 that performs the second detection has the smaller generated amount of the distortion (state quantity) than that of the distortion gauge 416 that performs the first detection. The disposition or the detection time are configured so that the environmental temperature is substantially equal to that of the distortion gauge 416 that performs the first detection.

In Embodiment 1, an example will be described in which preferable conditions of the distortion gauge 416 that performs the second detection are realized by the disposition with respect to the distortion gauge 416 that performs the first detection.

Figure 3A:
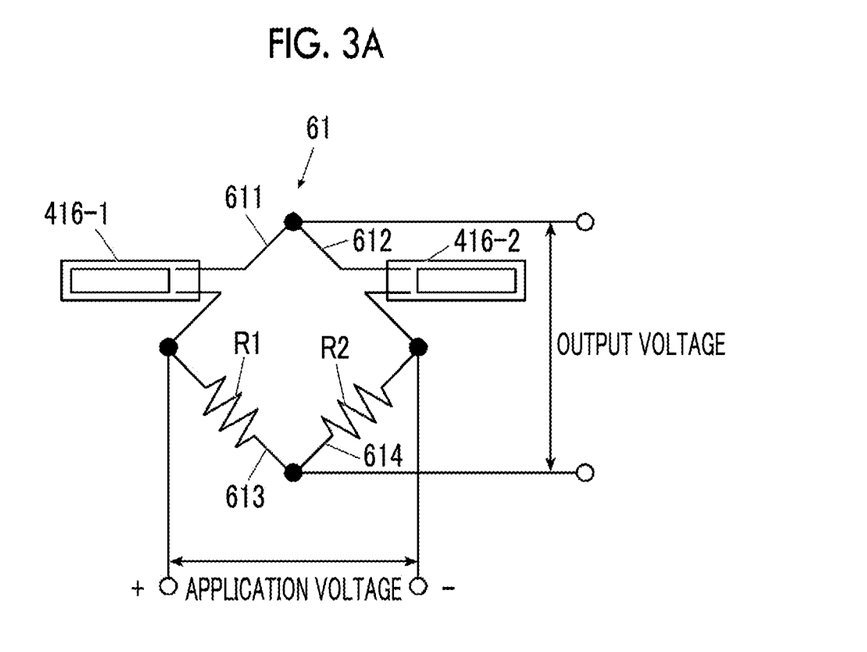
FIG. 3A illustrates a circuit diagram of a Wheatstone bridge circuit incorporating two distortion gauges in a non-diagonal disposition.
Figure 3B:
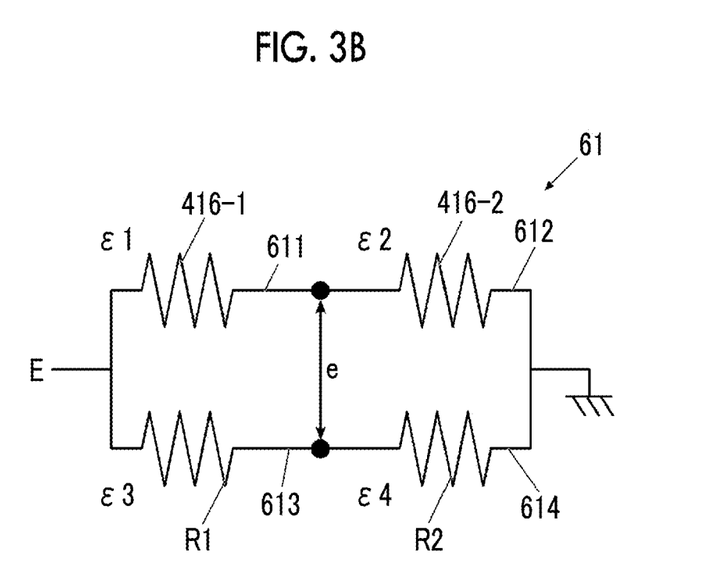
FIG. 3B illustrates an equivalent circuit schematic thereof.

FIG. 3A is a circuit diagram of a Wheatstone bridge circuit 61 incorporating two distortion gauges 416 in the non-diagonal disposition, and FIG. 3B is an equivalent circuit schematic thereof The Wheatstone bridge circuit 61 has first to fourth paths 611 to 614. Then, both one end portion of the first path 611 and one end portion of the third path 613 are connected to a positive electrode side of a voltage supply source. In addition, both one end portion of the second path 612 and one end portion of the fourth path 614 are connected to a negative electrode side (ground side) of the voltage supply source.

In addition, the Wheatstone bridge circuit 61 has a connection point in which the other end portion of the first path 611 and the other end portion of the second path 612 are connected, and a connection point in which the other end portion of the third path 613 and the other end portion of the fourth path 614 are connected. The measurement device 417 detects a potential difference between the two connection points, as the distortion detection signal.

The measurement device 417 includes two sets of the Wheatstone bridge circuits 61 incorporating two distortion gauges 416 in the non-diagonal disposition.

In the present embodiment, for example, one Wheatstone bridge circuit 61 incorporates the distortion gauge 416-1 and the distortion gauge 416-2, and the other Wheatstone bridge circuit 61 incorporates the distortion gauge 416-3 and the distortion gauge 416-4. The two distortion gauges 416 may be combined in the non-diagonal disposition in other ways.

FIG. 3A illustrates the Wheatstone bridge circuit 61 including a combination of the distortion gauges 416-1 and 416-2. The Wheatstone bridge circuit 61 including the combination will be described, and the other Wheatstone bridge circuits 61 will be omitted in the description.

In the other Wheatstone bridge circuits 61, the distortion gauges 416-1 and 416-2 in the following description may be respectively replaced with the distortion gauges 416-3 and 416-4.

In the Wheatstone bridge circuit 61, the distortion gauge 416-1 is provided in the first path 611, the distortion gauge 416-2 is provided in the second path 612, and resistors R1 and R2 are respectively provided in the third path 613 and the fourth path 614.

Both the resistors R1 and R2 have a resistance value equal to the resistance value of the distortion gauge 416 in a state where there is no distortion at a room temperature (for example, 20° C.).

As illustrated in the equivalent circuit schematic in FIG. 3B, in the Wheatstone bridge circuit 61, the distortion gauge 416-1 and the distortion gauge 416-2, which are connected in series, and the resistors R1 and R2 connected in series are connected in parallel between the positive electrode side and the negative electrode side of the voltage supply source.

Then, the measurement device 417 acquires the potential difference between the two points between the distortion gauge 416-1 and the distortion gauge 416-2 and between the resistor R1 and the resistor R2, as an output voltage e (distortion detection signal).

When a supply voltage from the voltage supply source is defined as E, the resistance values of the distortion gauge 416-1, the distortion gauge 416-2, the resistor R1, and the resistor R2 are respectively defined as ε1 to ε4, and the output voltage e is expressed by Equation (1) below.

$$e = (K/4)(\varepsilon 1 - \varepsilon 2 - \varepsilon 3 + \varepsilon 4) \cdot E \quad (1)$$

In addition, K is a gauge ratio, and is usually approximately 2.0.

Since ε3=ε4, the output voltage e is expressed by Equation (2) below, and is a value proportional to a difference between the resistance values (outputs) of the distortion gauge 416-1 and the distortion gauge 416-2.

$$e = (K/4) \cdot (\varepsilon 1 - \varepsilon 2) \cdot E \quad (2)$$

In the distortion gauge 416, characteristics of the resistance value corresponding to the distortion fluctuate depending on the environmental temperature. Therefore, in order to correctly detect the distortion, it is necessary to perform temperature compensation corresponding to the environmental temperature when the distortion is detected.

As described above, in the bending meshing type gear device 1, heat is mainly generated from the meshing portions between the first internal tooth portion 411 and the first external tooth portion 32, and between the second internal tooth portion 421 and the second external tooth portion 33. In the first internal tooth member 41, the heat is transferred from the internal tooth ring portion 412 to the external connection portion 413. In this case, the heat is transferred to all of the plurality of pillar members 415 existing therebetween under the same condition. Therefore, in each of the distortion gauges 416-1 to 416-4, each of the pillar members 415 always has substantially the same environmental temperature.

Then, the distortion gauge 416-1 and the distortion gauge 416-2 are in the non-diagonal disposition. Therefore, for example, when one distortion gauge 416-1 is located on the major axis side of the rotating wave generator 30A, the other distortion gauge 416-2 is located on the minor axis side of the wave generator 30A. Therefore, the distortion amount of the pillar member 415 provided with the distortion gauge 416-2 is sufficiently smaller than that of the pillar member 415 provided with the distortion gauge 416-1. For example, the distortion gauge 416-2 is in a state where there is almost no distortion.

That is, at a time when one distortion gauge 416-1 performs the first detection in which the distortion amount (state quantity) detected on the major axis side of the wave generator 30A is large, the other distortion gauge 416-2 detecting the other distortion amount performs the second detection in which the distortion amount (state quantity) detected on the minor axis side is sufficiently smaller than that in the first detection.

The detection value obtained from the distortion gauge 416-1 by performing the first detection is a value obtained by adding a fluctuation value accompanied by the environmental temperature in this case to a value corresponding to the distortion amount generated in the pillar member 415. However, the detection amount obtained from the distortion gauge 416-2 by performing the second detection at the same time is only the fluctuation value accompanied by the environmental temperature in this case since the distortion amount of the pillar member 415 is sufficiently small.

As described above, the Wheatstone bridge circuit 61 outputs the output voltage e proportional to the difference between the resistance values (outputs) of the distortion gauge 416-1 and the distortion gauge 416-2. Therefore, the output voltage e detected when the distortion gauge 416-1 is located on the major axis side is a value (detection value obtained by performing the temperature compensation) obtained by subtracting the fluctuation value accompanied by the environmental temperature from the value corresponding to the distortion amount generated in the pillar member 415 of the distortion gauge 416-1.

The distortion gauge 416-1 and the distortion gauge 416-2 are in the non-diagonal disposition. Accordingly, when the distortion gauge 416-2 is located on the major axis side to perform the first detection, the distortion gauge 416-1 performs the second detection on the minor axis side. Therefore, the temperature compensation of the detection value of the distortion gauge 416-2 can be performed.

In addition, the same Wheatstone bridge circuit 61 is configured to include the distortion gauge 416-3 and the distortion gauge 416-4. Therefore, the distortion can be detected while the temperature compensation is performed on the distortion gauge 416-3 and the distortion gauge 416-4.

Technical Effects of Embodiment 1

The sensor device 60 acquires the detection value based on the first detection when the distortion amount is large in the pillar member 415 of each of the distortion gauges 416 and the detection value based on the second detection in which the distortion amount is smaller than the first detection, and has the Wheatstone bridge circuit 61 that corrects the detection value of the first detection, based on the detection value of the second detection. Therefore, the distortion can be more accurately detected by suppressing influence of temperature drift which causes disturbance when the distortion is detected. In addition, the torque of the bending meshing type gear device 1 can be more accurately detected by more accurately detecting the distortion.

In addition, in the Wheatstone bridge circuit 61 of the sensor device 60, the first detection and the second detection are performed by separate distortion gauges 416 (for example, in the example of FIG. 3A, the distortion gauge 416-1 and the distortion gauge 416-2).

Therefore, since the first detection and the second detection can be performed at the same time, it is possible to shorten a time required for an entire measurement process.

In addition, the sensor device 60 uses a configuration in which each of a plurality of distortion gauges 416 sequentially performs the first detection and the second detection in response to the rotational operation of the bending meshing type gear device 1. In this manner, the distortion is detected by the distortion gauge 416 (for example, 416-1) that performs the first detection, and the correction is performed, based on the detection of the distortion gauge 416 (for example, 416-2) that performs the second detection at the same time.

Therefore, it is possible to detect the distortion accompanied by the temperature compensation without preparing a dedicated distortion gauge for correction (distortion gauge for the temperature compensation), and it is possible to reduce the number of the required distortion gauges 416.

In addition, it is not necessary to secure a space for installing the distortion gauge for the temperature compensation. Furthermore, it is possible to reduce a size of the target device.

In addition, the bending meshing type gear device 1 serving as a target device is a rotary device that performs a rotational operation. The sensor device 60 can continuously detect the distortion accompanied by the temperature compensation during the rotational operation by performing the first detection and the second detection in response to the rotational operation of the bending meshing type gear device 1.

In particular, the target device is the bending meshing type gear device 1. Accordingly, since a position of the major axis of the wave generator 30A rotates, the plurality of distortion gauges 416 are disposed around the wave generator 30A. In this manner, it is possible to periodically and continuously detect the distortion accompanied by the temperature compensation in response to the rotational operation.

Although the Wheatstone bridge circuit 61 has been described as an example of the correction unit, the example is not limited to the Wheatstone bridge circuit. As the correction unit, a configuration may be adopted to include other circuits which can perform correction of subtracting the detection value of the distortion detection signal of the distortion gauge 416 that performs the second detection from the detection value of the distortion detection signal of the distortion gauge 416 that performs the first detection.

Embodiment 2

Figure 4:
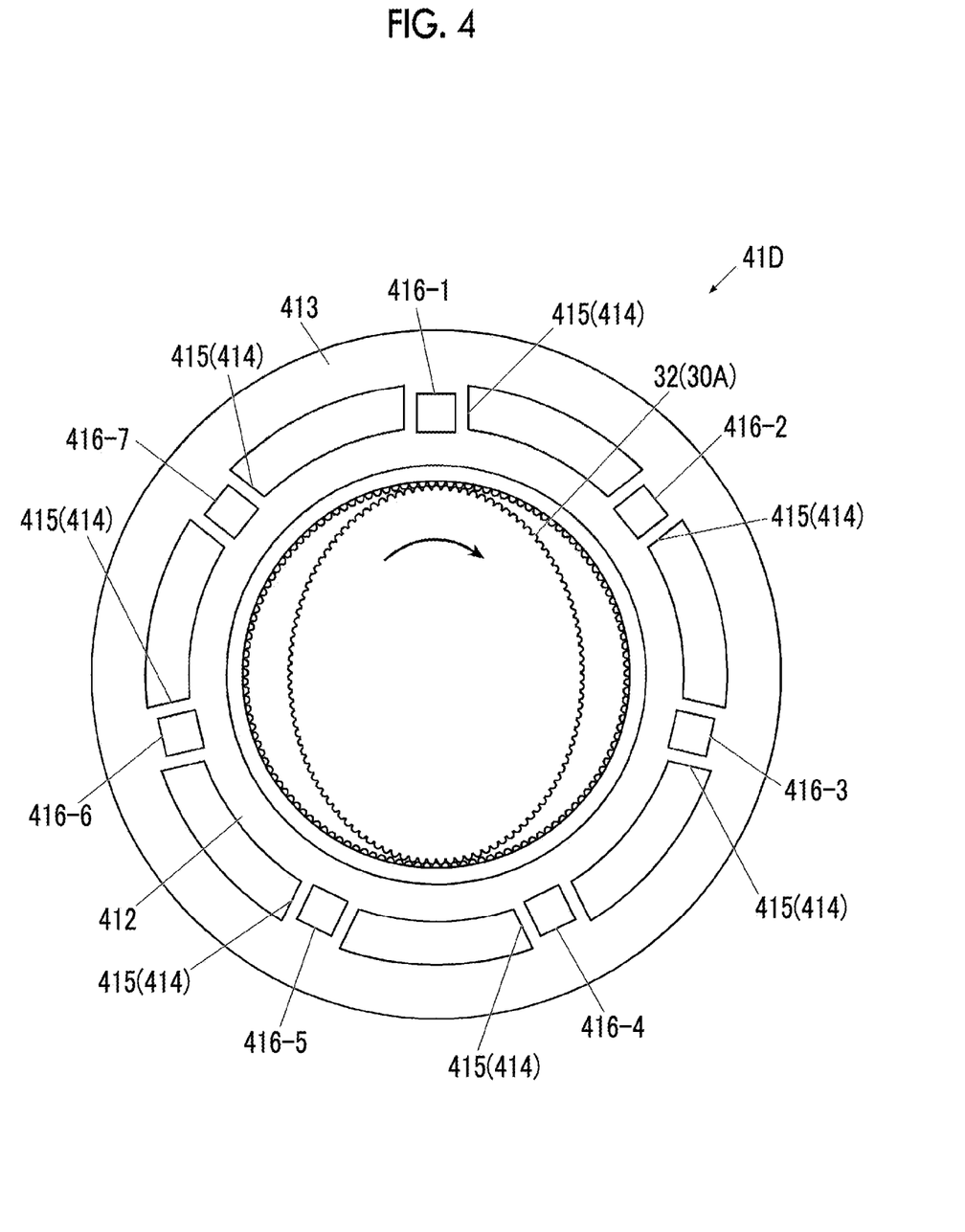
FIG. 4 is a front view illustrating a first internal tooth member of a bending meshing type gear device to which a sensor device according to Embodiment 2 is applied.

FIG. 4 is a front view illustrating a first internal tooth member 41D of the bending meshing type gear device 1 to which a sensor device according to Embodiment 2 of the present invention is applied.

In Embodiment 1 described above, a configuration in which the four distortion gauges 416 are provided at a uniform interval in the circumferential direction has been described as an example. However, the number of the distortion gauges 416 is not limited to the above-described example, and may be an odd number.

For example, as illustrated in FIG. 4, seven pillar members 415 may be provided, and the distortion gauges 416-1 to 416-7 may be individually provided in each of the pillar members 415.

In a case of the above-described disposition, for example, in a state where the distortion gauge 416-1 is located on the major axis side of the wave generator 30A, the distortion gauges 416-2, 416-3, 416-6, and 416-7 which are in the non-diagonal disposition with the distortion gauge 416-1 are located on the minor axis side. That is, when the distortion gauge 416-1 is located on the major axis side and detects a large distortion amount, the detected distortion amount of the distortion gauges 416-2, 416-3, 416-6, and 416-7 on the minor axis side is sufficiently small. Therefore, when the detection value of the first detection is acquired by the distortion gauge 416-1, it is preferable to acquire the detection value by performing the second detection from any of the distortion gauges 416-2, 416-3, 416-6, and 416-7.

For example, with regard to each of the distortion gauges 416, the Wheatstone bridge circuit 61 is configured to include the other distortion gauge 416 in the non-diagonal disposition. Accordingly, even when the number of the mounted distortion gauges 416 is different as in the first internal tooth member 41D, the distortion can be detected in the same manner as that of the first internal tooth member 41.

Even in a case of Embodiment 2, instead of the Wheatstone bridge circuit, as the correction unit, a configuration may be adopted to include other circuits which can perform correction of subtracting the detection value of the distortion detection signal of the distortion gauge 416 that performs the second detection from the detection value of the distortion detection signal of the distortion gauge 416 that performs the first detection.

Embodiment 3

Figure 5:
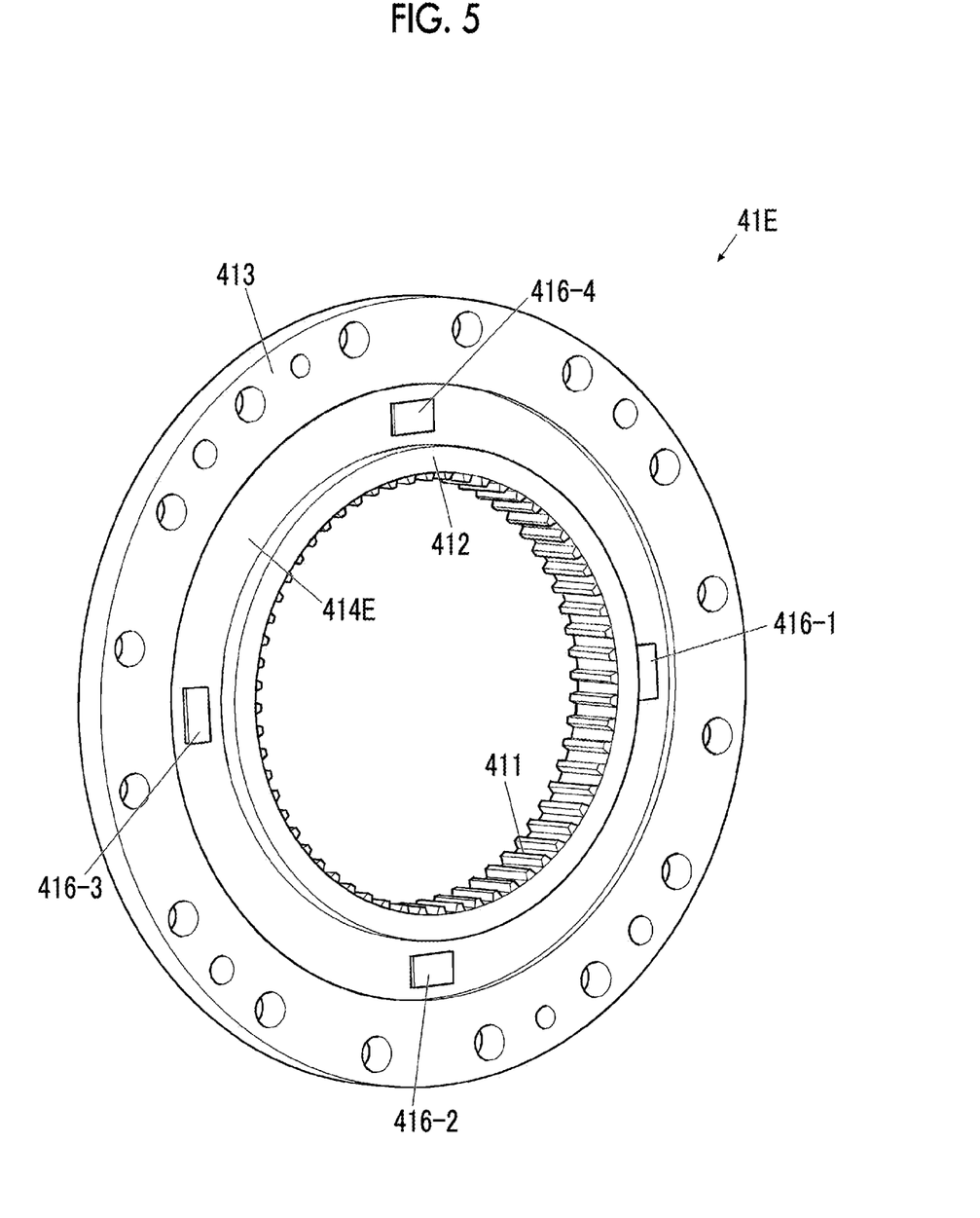
FIG. 5 is a perspective view illustrating another example of a first internal tooth member of a bending meshing type gear device to which a sensor device according to Embodiment 3 is applied.

FIG. 5 is a perspective view of a first internal tooth member 41E of the bending meshing type gear device 1 to which a sensor device according to Embodiment 3 of the present invention is applied.

In the first internal tooth member 41, the easily deformable portion 414 is configured to include the four pillar members 415 intermittently disposed in the circumferential direction. However, the configuration is not limited thereto.

In the first internal tooth member 41E, an easily deformable portion 414E is formed to have a ring-shaped flat plate which is continuous in the circumferential direction between the internal tooth ring portion 412 and the external connection portion 413.

Figure 6:
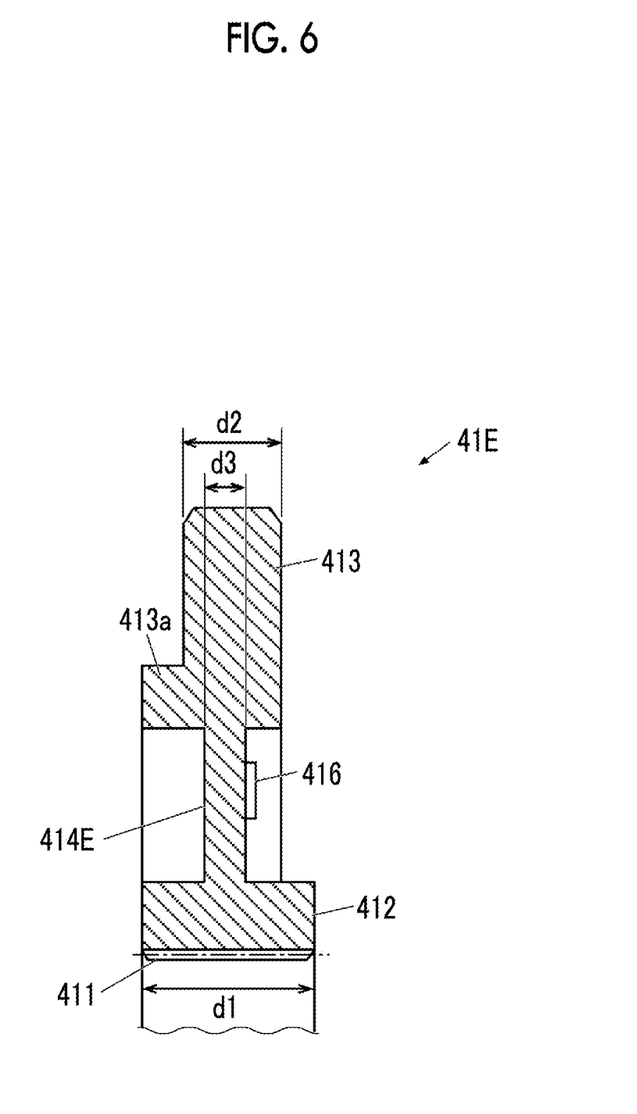
FIG. 6 is an axial sectional view of the first internal tooth member in FIG. 5.

However, as illustrated in the axial sectional view in FIG. 6, an axial thickness d3 of the easily deformable portion 414E is set to be smaller than any of an axial thickness d1 of the internal tooth ring portion 412 and an axial thickness d2 of the external connection portion 413.

Then, the plurality of distortion gauges 416 are attached onto any flat surface of the easily deformable portion 414E at a uniform interval in the circumferential direction. Here, a case where the four distortion gauges 416 are provided will be described as an example. The number of the distortion gauges 416 is not limited to four, and can be increased or decreased.

The respective distortion gauges 416 are attached in a direction for detecting the expansion-contraction distortion along the radial direction.

In this way, in the first internal tooth member 41E, the easily deformable portion 414E has a flat plate shape which is continuous in the circumferential direction. The axial thickness d3 is set to be smaller than the axial thickness d1 of the internal tooth ring portion 412 and the axial thickness d2 of the external connection portion 413. Therefore, the easily deformable portion 414E is more likely to be deformed than the internal tooth ring portion 412 when the torque is transmitted in the bending meshing type gear device. As a result, the expansion-contraction distortion is likely to occur along the radial direction. As in the easily deformable portion 414, the easily deformable portion 414E can also more accurately and satisfactorily detect the torque. The axial thickness d3 of the easily deformable portion 414E may be smaller than at least the axial thickness d1 of the internal tooth ring portion 412, and may be equal to the axial thickness d2 or larger than the axial thickness d2 of the external connection portion 413.

The easily deformable portion 414E is easily deformed by reducing the thickness. However, instead of reducing the thickness, the easily deformable portion 414E may be formed of a softer metal material or a softer resin material than the other portions (internal tooth ring portion 412 and external connection portion 413).

Furthermore, in Embodiments 1 to 3, the easily deformable portions 414 and 414E are provided in the first internal tooth members 41, 41D, and 41E, but this configuration is not essential.

For the first internal tooth member having no easily deformable portion, the plurality of distortion gauges 416 may be provided at a plurality of locations in which the distortion occurs due to the rotational operation of the bending meshing type gear device 1 and to which the temperature is similarly transmitted.

Embodiment 4

Figure 7:
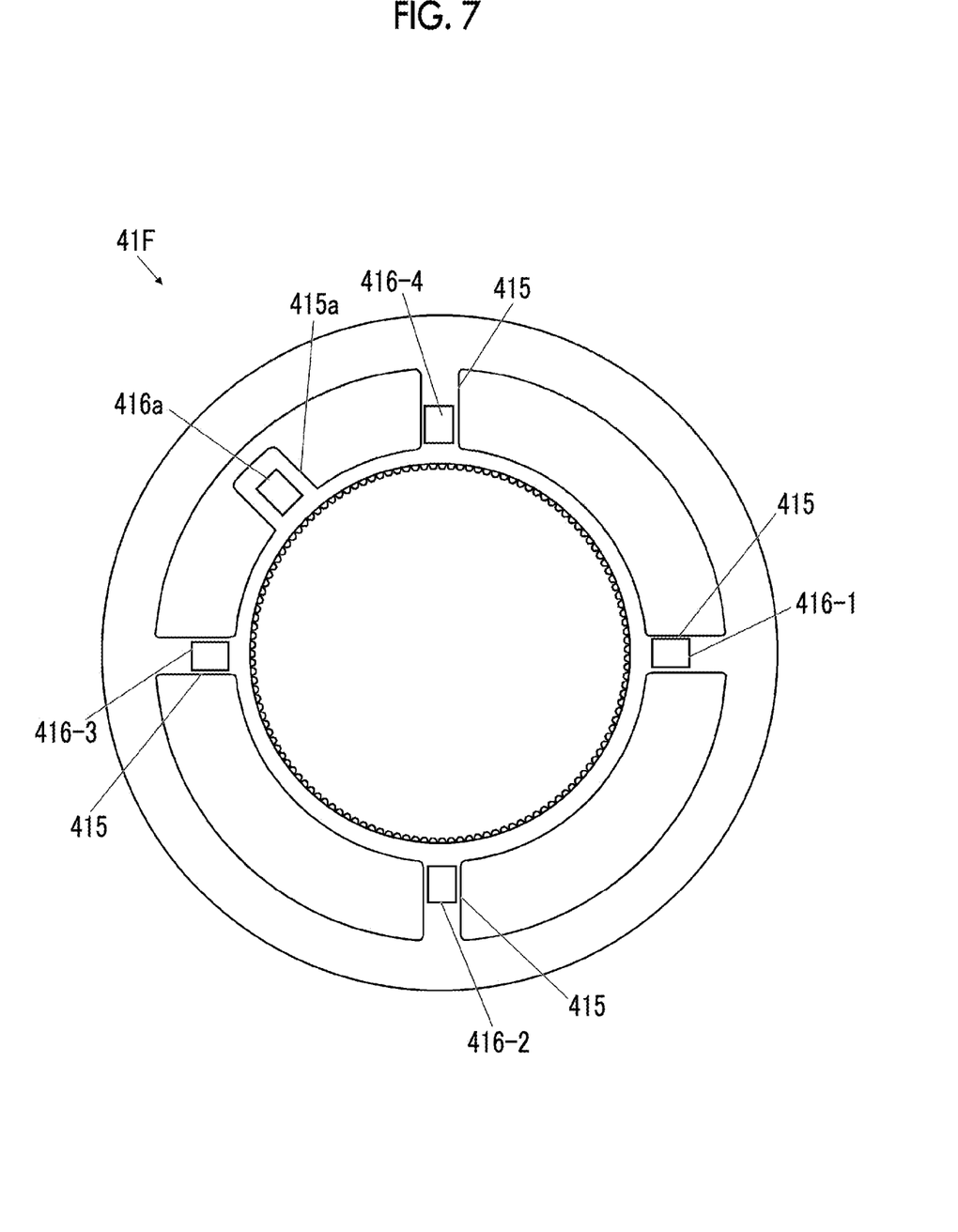
FIG. 7 is a front view illustrating a first internal tooth member of a bending meshing type gear device to which a sensor device according to Embodiment 4 is applied.

FIG. 7 is a front view illustrating a first internal tooth member 41F of the bending meshing type gear device 1 to which a sensor device according to Embodiment 4 of the present invention is applied.

The sensor device 60 provided in the first internal tooth member 41 is configured as follows. Each of the distortion gauges 416 provided at a uniform interval in the circumferential direction performs the first detection when located on the major axis side of the wave generator 30A. The other distortion gauge 416 in the non-diagonal disposition which is located on the minor axis side performs the second detection at the same time.

That is, all of the distortion gauges 416 provided in the first internal tooth member 41 are configured to perform the first detection and the second detection, and the distortion gauge that exclusively performs the second detection is not provided.

In contrast, the sensor device according to Embodiment 4 includes a dedicated distortion gauge 416a that performs only the second detection without performing the first detection (detecting a state quantity). The distortion gauge 416a is a distortion gauge having the same structure, characteristics, and performance as those of the distortion gauge 416.

The first internal tooth member 41F has a pillar member 415a extending outward in the radial direction from an outer periphery of the internal tooth ring portion 412 as in the pillar member 415 and whose extending end portion does not come into contact with the external connection portion 413. The distortion gauge 416a is provided in the pillar member 415a.

The pillar member 415a is formed of the same material as that of the pillar member 415, and is set to have the same width and thickness. In this manner, the temperature is transmitted to the same extent as the pillar member 415. Meanwhile, the pillar member 415a does not come into contact with the external connection portion 413. Accordingly, during the rotational operation of the bending meshing type gear device 1, the pillar member 415a has a structure in which the distortion does not occur even when located on the major axis side of the wave generator 30A.

Since the distortion gauge 416a is attached to the pillar member 415a, the distortion gauge 416a can perform the second detection in a state where the influence of the distortion change by the rotational operation of the bending meshing type gear device 1 is substantially eliminated at an environmental temperature substantially equal to that of the other distortion gauges 416.

Then, the sensor device according to Embodiment 4 can perform the temperature compensation, and can detect proper distortion by subtracting the detection value of the distortion detection signal obtained through the second detection of the distortion gauge 416a from the detection value of the distortion detection signal obtained through the first detection of the distortion gauge 416 located on the major axis side of the wave generator 30A during the rotational operation of the bending meshing type gear device 1.

In this case, the Wheatstone bridge circuit 61 is configured for each of the distortion gauges 416 by performing switching connection of the distortion gauge 416a so that Wheatstone bridge connection is performed at a time of the first detection of each of the distortion gauges 416.

In addition, alternatively, when the first detection of each of the distortion gauges 416 is performed, software processing may be performed so that the detection value is subjected to correction processing (subtraction processing), based on the detection value obtained through the second detection of the distortion gauge 416a.

Embodiment 5

Figure 8:
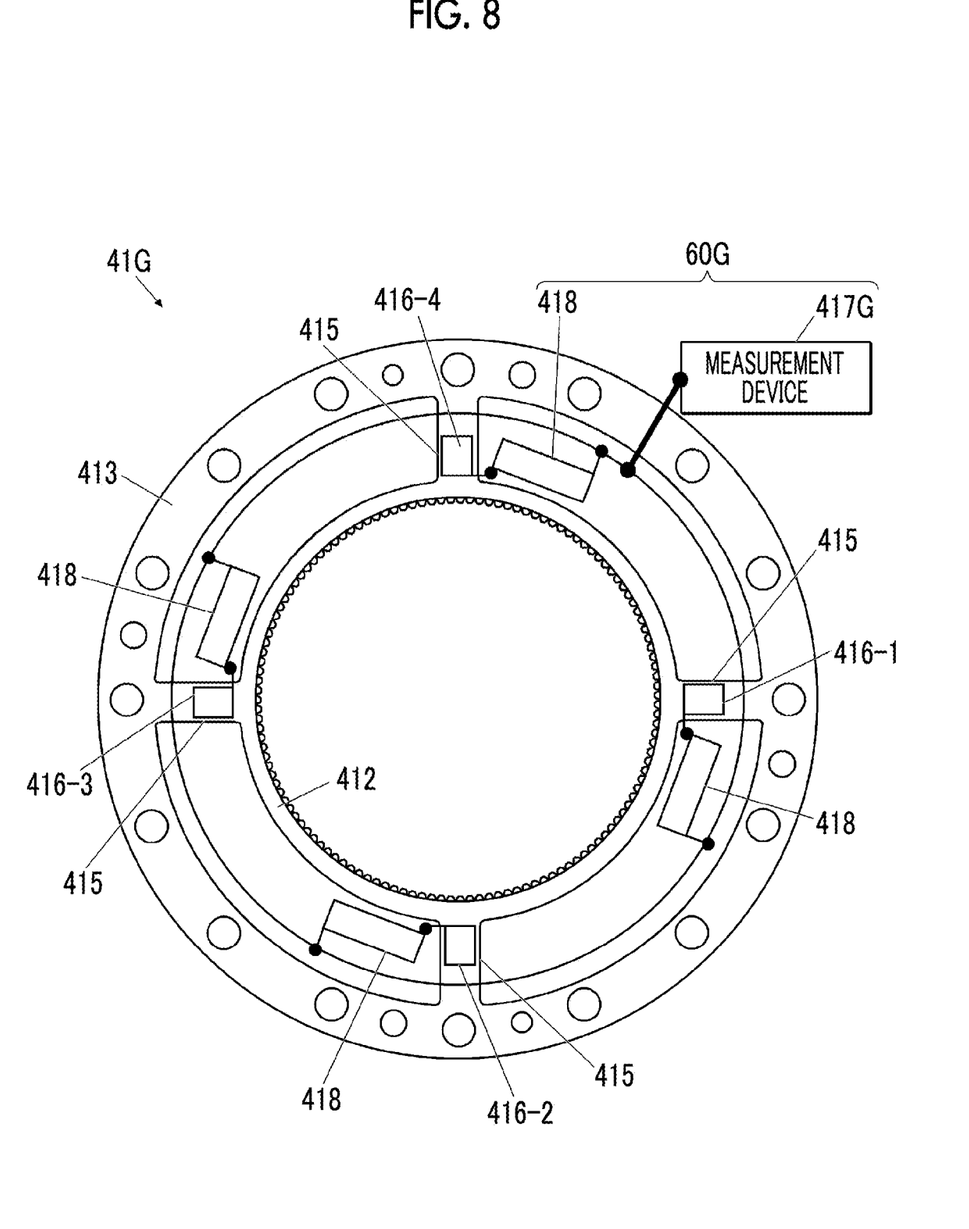
FIG. 8 is a front view of a first internal tooth member of a bending meshing type gear device to which a sensor device according to Embodiment 5 is applied.

FIG. 8 is a front view of a first internal tooth member 41G of the bending meshing type gear device 1 to which a sensor device 60G according to Embodiment 5 of the present invention is applied.

In the sensor device 60, the first detection and the second detection are performed by separate distortion gauges 416, and the distortion accompanied by temperature compensation from the detection value is detected, based on each of the distortion detection signals.

In contrast, in the sensor device 60G, each of the distortion gauges 416 performs the first detection when located on the major axis side of the wave generator 30A, and performs the second detection when the wave generator 30A rotates and is located on the minor axis side. The temperature compensation is performed by subtracting the detection value of the distortion detection signal based on the second detection performed by the same distortion gauge 416 from the detection value of the distortion detection signal based on the first detection performed by the distortion gauge 416.

Therefore, the sensor device 60G does not use the Wheatstone bridge circuit 61 which performs the distortion detection and the temperature compensation at the same time, as the correction unit.

The sensor device 60G has a plurality of processing circuits 418 for detecting a resistance value connected to each of the distortion gauges 416, and a measurement device 417G serving as the correction unit connected to each of the processing circuits 418.

Then, for each of the distortion gauges 416, the measurement device 417G includes a storage unit that stores the detection value based on the distortion detection signal during the first detection and the detection value based on the distortion detection signal during the second detection. In addition, when the detection value during the most recent first detection and the detection value during the most recent second detection are aligned in the storage unit for each of the distortion gauges 416, the measurement device 417G calculates the detection value of the distortion subjected to the temperature compensation for each of the distortion gauges 416.

In the sensor device 60G described in Embodiment 5, each of the distortion gauges 416 performs the first detection and the second detection in any order, and individually detects the distortion accompanied by the temperature compensation for each of the distortion gauges 416, based on the detection value acquired through the first detection performed by the same distortion gauge 416 and the detection value acquired through the second detection.

Therefore, a dedicated distortion gauge for performing the second detection is unnecessary. Furthermore, it is not necessary to prepare a pair of the distortion gauge 416 for performing the first detection and the other distortion gauge 416 for performing the second detection. Therefore, it is possible to achieve a simplified configuration, facilitated manufacturing, and a reduced number of components.

In addition, when the plurality of distortion gauges 416 are provided, it is not necessary to select the disposition in which the environmental temperatures of the respective distortion gauges 416 are equal to each other, and it is possible to secure a degree of freedom in design.

In addition, according to the above-described configuration, it is possible to reduce the minimum number of the distortion gauges 416 to only one.

In addition, in the bending meshing type gear device 1 serving as the target device, each of the distortion gauges 416 performs the first detection when located on the major axis side of the wave generator 30A, performs the second detection when located on the minor axis side, and detects the distortion accompanied by the temperature compensation from the detection values.

As described above, the sensor device 60G can particularly preferably detect the distortion for the bending meshing type gear device 1 in which each of the distortion gauges 416 is likely to have an opportunity to periodically perform the first detection and the second detection.

Other Configurations

Details in the above-described respective embodiments can be appropriately changed within the scope not departing from the concept of the invention.

For example, in the sensor device described in each of the above-described embodiments, the bending meshing type gear device of a tubular type and serving as the target device has been described as an example. However, the sensor device is also preferably applicable to the bending meshing type gear device other than the tubular type, for example, a cup type or a silk hat type.

Furthermore, the sensor device described in the respective embodiments is not limited to the bending meshing type gear device serving as the target device, and is also applicable to other devices performing various operations including a rotational operation and a linear motion operation, for example, such as a motor, a linear motor, a ball screw unit, and injection molding machines. In this case, when a configuration having the plurality of distortion gauges is adopted, it is preferable to dispose the plurality of distortion gauges around a member performing the rotational operation or to dispose the plurality of distortion gauges in parallel in an operation range of a member performing the linear motion operation.

In addition, the distortion gauge has been described as the detection unit. However, without being limited thereto, the configuration of the sensor device is applicable to various sensors that require the correction such as the temperature compensation. For example, the detection unit other than the distortion gauge includes a magnetic sensor and a vibration sensor.

In addition, in the embodiments, the correction is performed by subtracting the detection value of the second detection from the detection value of the first detection. However, a correction method is not particularly limited as long as the detection value of the first detection is corrected, based on the detection value of the second detection. For example, the detection value of the second detection may be multiplied by a predetermined coefficient, and may be subtracted from the detection value of the first detection.

It should be understood that the invention is not limited to the above-described embodiment, but may be modified into various forms on the basis of the spirit of the invention. Additionally, the modifications are included in the scope of the invention.

What is claimed is:

1. A sensor device that detects a predetermined state quantity, comprising:
   a correction unit that performs first detection and second detection having a smaller generated state quantity than the first detection, and that corrects a detection value of the first detection, based on a detection value of the second detection,
   wherein the first detection and the second detection are performed by different detection units,
   a plurality of the detection units perform the first detection and the second detection in response to an operation of a target device,
   the target device is a rotary device, and the plurality of detection units perform the first detection and the second detection in response to rotation of the rotary device,
   the rotary device is a bending meshing type gear device including a wave generator having a substantially elliptical outer shape in an axially right-angled cross section, and the detection unit on a major axis side of the wave generator performs the first detection, and the detection unit on a minor axis side of the wave generator performs the second detection.

2. The sensor device according to claim 1,
wherein the first detection and the second detection are performed by the same detection unit, and the first detection and the second detection are switched therebetween with a lapse of time.

3. The sensor device according to claim 2,
wherein a target device is a bending meshing type gear device including a wave generator having a substantially elliptical outer shape in an axially right-angled cross section, and
the detection unit performs the first detection when the detection unit is closer to a major axis side than a minor axis side of the wave generator, and performs the second detection when the detection unit is closer to the minor axis side compared to when the first detection is performed.

4. The sensor device according to claim 1, further comprising:
a detection unit that performs the second detection without performing the first detection.

5. The sensor device according to claim 4,
wherein a target device is a bending meshing type gear device, and
the detection value of the second detection is subtracted from the detection value of the first detection during a rotational operation of the target device.

6. The sensor device according to claim 1,
wherein the correction unit includes a first path, a second path, a third path, and a fourth path.

7. The sensor device according to claim 6,
wherein one end portion of the first path and one end portion of the third path are connected to a positive electrode side of a voltage supply source, and
one end portion of the second path and one end portion of the fourth path are connected to a negative electrode side of the voltage supply source.

8. The sensor device according to claim 7,
wherein the correction unit includes a connection point in which the other end portion of the first path and the other end portion of the second path are connected, and a connection point in which the other end portion of the third path and the other end portion of the fourth path are connected.

9. The sensor device according to claim 8,
wherein a first detection unit, which constitutes the plurality of detection units, is provided in the first path,
a second detection unit, which constitutes the plurality of detection units, is provided in the second path, and
resistors are respectively provided in the third path and in the fourth path.

10. The sensor device according to claim 1, further comprising:
a rotation detection device configured to detect a rotation angle of the wave generator,
wherein the plurality of detection units perform the first detection at a time when the rotation detection device detects the rotation angle on the major axis side of the wave generator.

11. The sensor device according to claim 1,
wherein the bending meshing type gear device includes an internal tooth ring portion having an inner periphery on which an internal tooth of a first internal tooth portion is formed,
an external connection portion configured to be connected to an external member, and
an easily deformable portion which is provided between the internal tooth ring portion and the external connection portion in a radial direction, and is configured to be more easily deformed than the internal tooth ring portion when a torque acts on the first internal tooth portion, and
the plurality of detection units are provided in the easily deformable portion.

\* \* \* \* \*